(12) United States Patent
Abro et al.

(10) Patent No.: US 12,508,855 B2
(45) Date of Patent: Dec. 30, 2025

(54) TOW HITCH LEAD IN SYSTEM

(71) Applicant: Toyota Motor Engineering & Manufacturing North America, Inc., Plano, TX (US)

(72) Inventors: Lauren M. Abro, West Bloomfield, MI (US); Yuko N. Gidcumb, West Bloomfield, MI (US); Michelle R. Vargo, Plymouth, MI (US); Lindsay A Babian, Canton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 259 days.

(21) Appl. No.: 18/116,790

(22) Filed: Mar. 2, 2023

(65) Prior Publication Data

US 2024/0294043 A1 Sep. 5, 2024

(51) Int. Cl.
*B60D 1/36* (2006.01)
*G06T 7/70* (2017.01)

(52) U.S. Cl.
CPC .............. *B60D 1/363* (2013.01); *G06T 7/70* (2017.01); *G06T 2207/10028* (2013.01); *G06T 2207/30252* (2013.01)

(58) Field of Classification Search
CPC ............ G06T 7/70; G06T 2207/10028; G06T 2207/30252; B60D 1/363
See application file for complete search history.

(56) References Cited

U.S. PATENT DOCUMENTS

| | | |
|---|---|---|
| 3,773,356 A | 11/1973 | Eichels et al. |
| 4,840,392 A | 6/1989 | Baskett |
| 5,697,630 A | 12/1997 | Thompson et al. |
| 6,102,422 A | 8/2000 | Damron |
| 6,796,573 B2 | 9/2004 | Beaudoin |
| 6,874,804 B2 | 4/2005 | Reese et al. |
| 6,976,694 B1 | 12/2005 | Rayl et al. |
| 7,131,658 B2 | 11/2006 | MacKarvich |
| D636,710 S | 4/2011 | Story |
| 8,313,119 B2 | 11/2012 | Frantz |
| D870,605 S | 12/2019 | Huebner |
| 2003/0094785 A1 | 5/2003 | Woods |
| 2005/0200099 A1 | 9/2005 | Moberly et al. |
| 2006/0097480 A1 | 5/2006 | Hegefeld |
| 2007/0007748 A1* | 1/2007 | Hancock .............. B60D 1/36 280/477 |
| 2007/0205580 A1 | 9/2007 | Hamilton et al. |

(Continued)

*Primary Examiner* — Andrea C Leggett
(74) *Attorney, Agent, or Firm* — Snell & Wilmer LLP (57) ABSTRACT

Methods and systems for aligning a vehicle and a trailer. The system includes a guide coupled to a tow hitch of the vehicle, a plurality of sensors disposed along the guide, and an electronic control unit (ECU). The guide includes a first arm extending from a hinge and a second arm extending from the hinge. The first arm and the second arm are configured to provide a space therebetween to receive a tongue of the trailer. The plurality of sensors are configured to detect sensor data indicative of an alignment between the vehicle and the trailer. The ECU is configured to receive the sensor data, determine a position of the tongue relative to the first arm and the second arm, and transmit the determination to the vehicle.

19 Claims, 8 Drawing Sheets

(56) References Cited

U.S. PATENT DOCUMENTS

| | | | |
|---|---|---|---|
| 2017/0363227 A1* | 12/2017 | Henry | B60P 3/035 |
| 2021/0379791 A1* | 12/2021 | Janowski | B27L 7/06 |
| 2023/0074065 A1* | 3/2023 | Howells | E02F 9/085 |
| 2023/0294465 A1* | 9/2023 | Vrahoretis | B60D 1/62 |
| | | | 296/50 |
| 2024/0075778 A1* | 3/2024 | Lacaze | B60D 1/64 |

* cited by examiner

TOW HITCH LEAD IN SYSTEM

BACKGROUND

1. Field

This specification relates to a system and a method for dynamically adjusting the position of a trailer hitch of a vehicle.

2. Description of the Related Art

Vehicles, such as trucks or sport utility vehicles, for example, may include a trailer hitch located at a rear end of the vehicle. A trailer may be attached to the trailer hitch and the trailer may be pulled by the vehicle. For instance, the trailer main may include a tongue extending outward from a front end of the trailer, and a coupler attached to the tongue to couple to the trailer hitch. The trailer may be enclosed, covering cargo of the trailer, or the trailer may be open, exposing the cargo of the trailer to the outside environment.

When a driver of the vehicle is looking to attach the trailer hitch to the trailer, the driver needs to steer the vehicle in reverse so that the hitch is close to the trailer in order for the two to be easily connected. If the hitch and the trailer are not close enough together or not aligned properly, the driver will have to make several attempts to steer and align the vehicle so the two can properly be connected. This is very inefficient and wastes time as it is difficult to align correctly. These drawbacks affect the ease of operating a vehicle with a connected trailer. Thus, there is a need for an improved tow hitch lead-in system.

SUMMARY

Disclosed herein are methods and systems for aligning a vehicle and a trailer. The system includes a guide coupled to a tow hitch of the vehicle, a plurality of sensors disposed along the guide, and an electronic control unit (ECU). The guide includes a first arm extending from a hinge and a second arm extending from the hinge. The first arm and the second arm are configured to provide a space therebetween to receive a tongue of the trailer. The plurality of sensors are configured to detect sensor data indicative of an alignment between the vehicle and the trailer. The ECU is configured to receive the sensor data, determine a position of the tongue relative to the first arm and the second arm, and transmit the determination to the vehicle.

In another aspect, a tow hitch lead-in system is disclosed. The tow hitch lead-in system includes a vehicle comprising a hitch disposed on a rear end of the vehicle, a trailer comprising a tongue disposed on a front end of the trailer and configured to couple to the hitch, and a guide coupled to a tow hitch of the vehicle. The guide is configured to provide an error tolerance for aligning the vehicle and the trailer.

In yet another aspect, a method for aligning a vehicle to a trailer is described herein. The method includes detecting, by one or more sensors of a guide, sensor data indicating a location and an orientation of the trailer relative to the vehicle, determining, by an electronic control unit (ECU), a position of a tongue of the trailer relative to a hitch of the vehicle based on the sensor data, and transmitting the determination of the position of the tongue to the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for guiding, monitoring, and/or viewing a trailer hitch to attach a towing vehicle to a towed vehicle. The systems and methods described herein includes a retractable arm mechanism and sensors placed thereon to guide the trailer hitch and provide sensor and/or video feedback to a driver. The retractable arm mechanism may extend outward in a "V" shape to help guide the driver. Additionally, a base of the retractable arm mechanism may extend from the trailer hitch depending on an amount of lead needed to guide the hitch to the trailer. Sensor and/or video data from the sensors/cameras may be sent to a display screen so the driver can see images, for instance, of the hitch and the trailer.

Conventional vehicles have hitches located at a lengthwise centerline axis along the rear end of conventional vehicles, and the hitches of conventional vehicles do not move. In addition, trailers have tongues that couple to the hitches of conventional vehicles, and the tongues are located at a lengthwise centerline axis of the trailer and extend outward from the trailer at a front end of the trailer. Since the tongues of trailers and hitches of conventional vehicles do not move, there is a possibility of misalignment between the vehicle and the trailer when the vehicle backs up toward the trailer. Aftermarket attachments that can be put onto the hitch are not easily accessible and does not provide sensor feedback to the driver. The systems and methods describe herein prevent (or mitigate) these issues.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

Figure 1A:
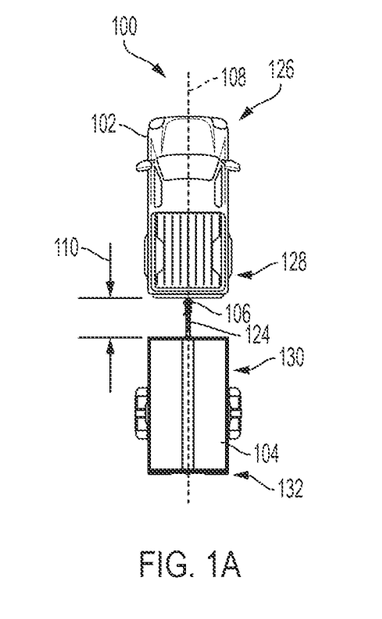
FIGS. 1A-1B illustrate a vehicle with a trailer, according to various embodiments of the invention.
Figure 1B:
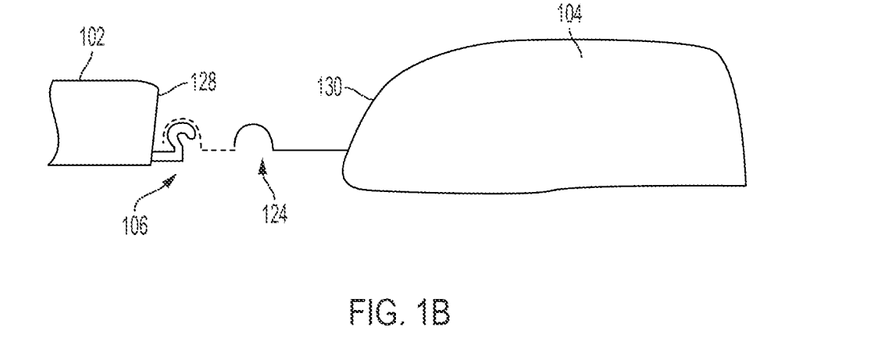

FIGS. 1A-1B illustrate a vehicle using the dynamic lateral trailer hitch positioning system with a trailer. The vehicle 102 may be any vehicle configured to couple to a trailer 104. For example, the vehicle 102 may be a truck, a sport utility vehicle, an all-terrain vehicle, or a tractor. The vehicle 102 has a front end 126 and a rear end 128. The vehicle 102 may have a hitch (or trailer hitch) 106 located at a rear end 128. The hitch 106 may have a channel (e.g., a square-shaped channel) for receiving a mount (e.g., a ball mount). The mount may be secured to the hitch 106 via a retainer (e.g., a pin). As used herein, "hitch" or "trailer hitch" may refer to the channel for receiving the mount alone or may also refer to the channel and the mount together. The hitch 106 may be coupled to the frame of the vehicle 102 and is capable of mating with an object (e.g., a trailer) to couple the object to the vehicle 102.

The trailer 104 may be any object capable of receiving cargo and being pulled by the vehicle 102. The trailer 104 may be covered or uncovered. The trailer 104 may have multiple wheels for traversing roads or paths.

The trailer 104 has a front end 130 and a rear end 132. The trailer 104 has a tongue 124 located at the front end 130 and extending outward from the front end 130. The tongue 124 may have a coupler located at the tip end of the tongue 124. The coupler is configured to mate with the hitch 106. For example, when the hitch 106 includes a ball, the ball may be received and secured by the coupler to maintain the connection between the hitch 106 and the tongue 124, and more broadly, the connection between the vehicle 102 and the trailer 104.

Conventional hitches are located along a lengthwise centerline axis of the vehicle. Similarly, conventional tongues are located along a lengthwise centerline axis of the trailer. Thus, conventional hitches and tongues (as well as conventional vehicles and trailers) are aligned with a centerline axis 108, as shown in FIG. 1A.

As shown in FIG. 1A, when the hitch 106 of the vehicle 102 lies along the centerline axis 108, the rear end 128 of the vehicle 102 is separated from the front end 130 of the trailer 104 by a first distance 110.

The vehicle 102 may use sensor data to determine the exact location to shift the hitch 106 to, along the rear end 128 of the vehicle 102. This determination of ideal location (or "target location") may be made prior to moving the hitch 106. Adjustments to the hitch 106 location may be made as updated sensor data is detected.

In some embodiments, a display (e.g., part of an infotainment unit or an instrument panel) within the passenger cabin of the vehicle may show the location of the hitch 106 on an on-screen graphic when it is moved. The relative location and orientation of the vehicle and the trailer may also be shown.

Figure 2:
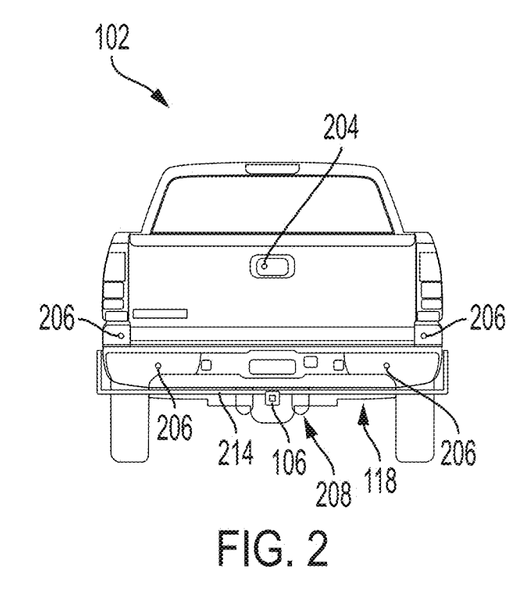
FIG. 2 illustrates a rear view of a vehicle with a trailer hitch lead-in system, according to various embodiments of the invention.

FIG. 2 illustrates a rear end 118 of the vehicle 102. The hitch 106 may be located below a bumper of the vehicle 102 or along a bumper of the vehicle 102. The hitch 106 may be located along a track 214 that spans a width (or a substantial width) of the vehicle 102. The hitch 106 may travel laterally along the track 214. As shown in FIG. 2, the hitch 106 may have a baseline position 208 at a center of the track 214, aligned with the lengthwise centerline axis of the vehicle 102. In various embodiments, the hitch 106 may move to a left position to the left of the baseline position 208. In various embodiments, the hitch 106 may move to a right position to the right of the baseline position 208. For instance, the hitch 106 may be configured to rotate relative to a pivot point, or hinge 304 (e.g., see FIG. 3C). A rear-view camera 204 may be located adjacent to a handle for opening a trunk or a tailgate of the vehicle 102. The rear-view camera may be one or more cameras and/or image sensors. Clearance sensors 206 located on the rear end 118 of the vehicle 102 are configured to detect the proximity of the trailer 104 to the rear of the vehicle 102.

Referring now to FIGS. 3A-3E, a hitch lead in system 300 is illustrated. The hitch lead in system 300 includes a guide 302. The guide 302 may be removably coupled to the hitch 106. For instance, the guide 302 may be clipped, screwed, pinned, or otherwise attached to the hitch 106. The guide 302 may be rotatably coupled to the hitch 106 via a hinge 304. As such, the guide 302 may be configured to rotate from a stowed position (e.g., see FIG. 3A) to a deployed position (e.g., see FIG. 3B) by rotating the guide 302 about the hinge 304. In various embodiments, the hinge 304 may be located at an end of the hitch 106, proximate the ball of the hitch 106. In various embodiments, the hinge 304 may be located adjacent the rear end 118, or bumper, of the vehicle 102 (e.g., see FIG. 3E).

Figure 3A:
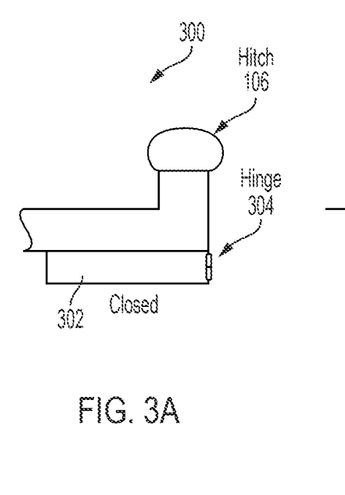
FIGS. 3A-3E illustrate a trailer hitch lead-in system, according to various embodiments of the invention.
Figure 3B:
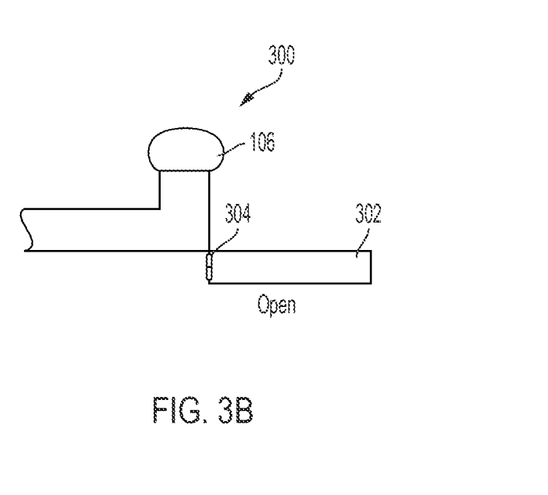
Figure 3C:
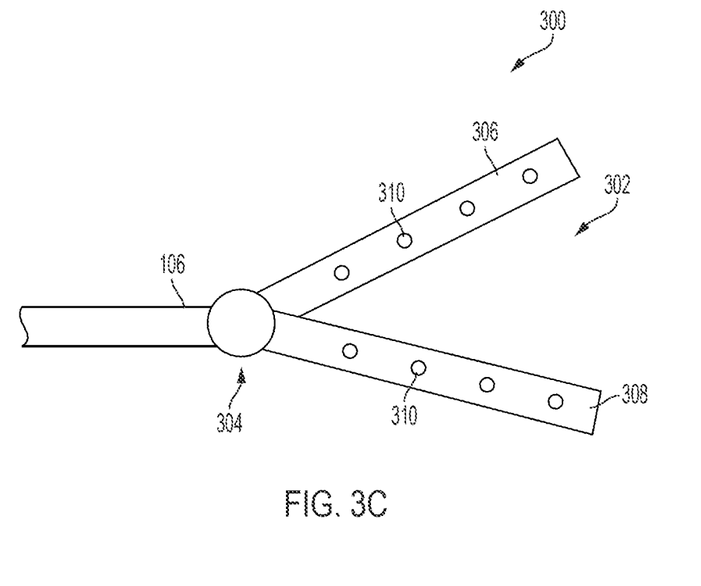
Figure 3D:
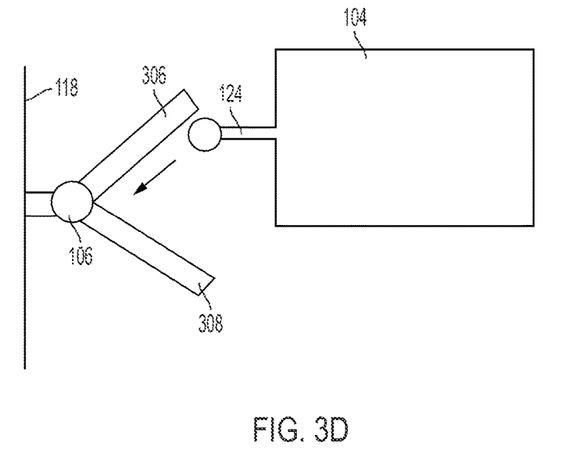
Figure 3E:
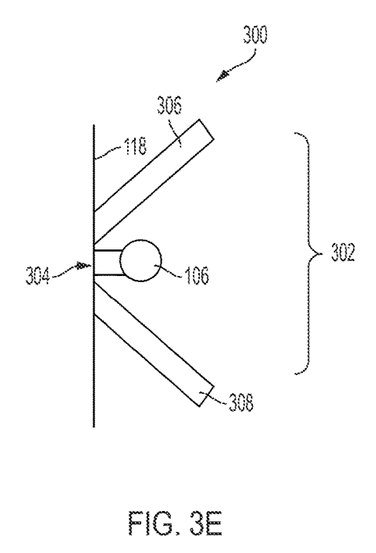

In various embodiments, the guide 302 may move along a track along the hitch 106. As such, the guide 302 may be configured to move from the deployed position as shown in FIG. 3E to the deployed position as shown in FIG. 3D. For instance, the guide 302 may include a wheel configured to be received by the track such that the guide 302 is configured to roll, slide, etc. In various embodiments, the guide 302 may be positioned manually. In various embodiments, an actuator coupled to the track may move the guide 302 along the track. For instance, a pneumatic or hydraulic cylinder may be used to move the guide 302 along the track. In yet other embodiments, there may also be a plurality of teeth located along the length of the track, and the guide 302 may be connected to a gear with corresponding teeth configured to mesh with the teeth of the track. An actuator coupled to the gear may rotate the gear in a first direction or a second direction to move the guide 302 along the track. While threads, toothed gears, and pneumatic or hydraulic cylinders are described herein, any other method or device for adjusting the location of the guide 302 along the track 214 may be used.

The guide 302 may include a first arm 306 and a second arm 308. In the deployed position, the first arm 306 and the second arm 308 may be configured in a V-formation. For instance, a vertex of the V-formation (e.g., the meeting point between the first arm 306 and the second arm 308) may align with the hitch 106 such that the first arm 306 and the second arm 308 extend outward from the hitch 106. The first arm 306 and the second arm 308 may extend away from the sides of the hitch 106 and extend beyond the end of the hitch 106. The first arm 306 and the second arm 308 may be rotatably coupled to the hinge 304. As such, the first arm 306 and the second arm 308 may be configured to rotate from the stowed position to the deployed position via the hinge 304, and may be configured to be positioned with a variable distance between the first arm 306 and the second arm 308. In other words, the first arm 306 may be positioned a first distance from the second arm 308, the first arm 306 may be positioned a second distance from the second arm 308, the second distance being larger than the first distance, the first arm 306 may be positioned a third distance from the second arm 308, the third distance being larger than the second distance, etc. Such a "scissor style" shape that can be rotated out when needed provides optional support to the driver without having a permanent extension extending from the vehicle 102.

The guide 302 may further include a plurality of sensors 310. The sensors 310 are configured to detect sensor data used to provide feedback to the user to indicate the relative position and orientation of the vehicle 102 and the trailer 104. One or more of the sensors 310 may be a camera.

The sensors 310 may include a rear-view camera (or image sensor) configured to detect image data of the environment behind the vehicle 102. The rear-view camera may also be used to display the environment behind the vehicle 102 to the driver to assist the driver in maneuvering the vehicle while parking the vehicle 102. The detected image data from the rear-view camera may be analyzed and used to determine proximity of the trailer 104 to the vehicle 102 as well as orientation of the trailer 104 relative to the vehicle 102. For example, reference locations of the trailer 104 may be detected based on analysis of the image data, and the detection of these reference locations and comparison to baseline values may be used to determine the orientation of the trailer 104 relative to the vehicle 102 and may also be used to determine a proximity of the trailer 104 to the vehicle 102. The rear-view camera 204 may be located adjacent to a handle for opening a trunk or a tailgate of the vehicle 102. The rear-view camera may be one or more cameras and/or image sensors.

The sensors 310 may also include clearance sensors (e.g., RADAR or LIDAR sensors) configured to detect the proximity of the trailer 104 to the rear of the vehicle 102. When there are multiple clearance sensors, they may be configured to detect the proximity of the trailer 104 to the respective rear parking clearance sensor 206. The clearance sensors may also be configured to detect an orientation of the trailer 104 relative to the vehicle 102. For example, the clearance sensors 206 may detect a plurality of reference locations of the trailer 104 and the detection of these reference locations and comparison to baseline values may be used to determine the orientation of the trailer 104 relative to the vehicle 102. The clearance sensors 206 may also be used to provide feedback to the driver of the vehicle 102 regarding the distance between the rear of the vehicle 102 and an object behind the vehicle 102.

The sensors 310 may also include an angle detection sensor configured to detect an angle of the trailer 104 relative to the vehicle 102. The angle detection sensor may be an image sensor, or a spatial detection sensor (e.g., RADAR or LIDAR), for example. The angle detection sensor may detect a plurality of reference locations of the trailer 104 and the detection of these reference locations and comparison to baseline values may be used to determine the angle of the trailer 104 relative to the vehicle 102. The detected angle may correspond to the angle formed between the lengthwise centerline axis of the vehicle 102 compared to the lengthwise centerline axis of the trailer 104. Thus, an angle of 0 degrees would indicate that the vehicle 102 and the trailer 104 are aligned, and an angle of 90 degrees would indicate that the vehicle 102 and the trailer 104 are perpendicular to each other. In some embodiments, a positive angle value may indicate that the trailer 104 is angled to the left of the vehicle 102 and a negative angle value may indicate that the trailer 104 is angled to the right of the vehicle 102, or vice versa. In other embodiments, all detected angle values are positive, and an additional indication of left or right may be provided to indicate whether the trailer 104 is angled to the left or right of the vehicle 102.

While the sensors 310 are shown in FIG. 3C, for instance, as being in particular locations, in some embodiments, the sensors 310 may be disposed in any suitable arrangement.

FIG. 3D illustrates a process of a vehicle 102 aligning with a trailer 104. More specifically, the process of aligning the hitch 106 of the vehicle 102 with the tongue 124 of the trailer 104 is shown. For instance, when the driver begins to drive the vehicle 102 in reverse toward the trailer 104, the vehicle 102 and the trailer 104 are not aligned. That is, the lengthwise centerline axis of the vehicle 102 is not aligned with the lengthwise centerline axis of the trailer 104. Accordingly, the hitch 106 in the baseline position and the tongue 124 are not aligned.

Conventionally, when a vehicle and a trailer are in a situation where they are not aligned, the vehicle or the trailer would be moved to place the vehicle and the trailer in alignment. However, it may be cumbersome and difficult to shift a large vehicle or a heavy trailer by precise, oftentimes small, distances. Using the systems and methods described herein, an error tolerance is provided in order to align the hitch 106 and the tongue 124.

Figure 4:
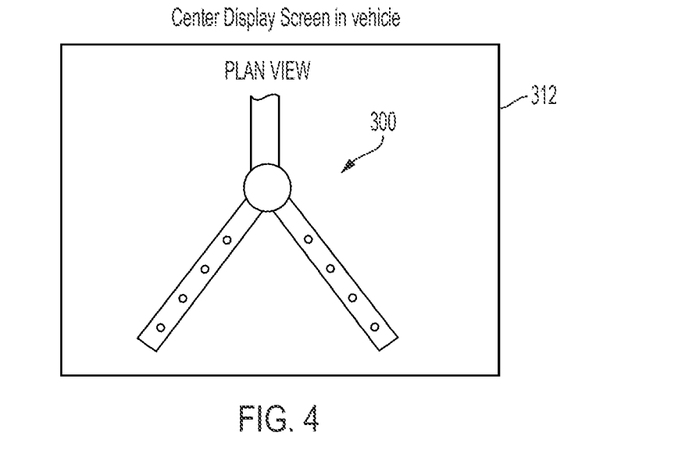
FIG. 4 illustrates a user interface of the trailer hitch lead-in system of FIGS. 3A-3E, according to various embodiments of the invention.

In various embodiments, the vehicle 102 uses sensor data from the various sensors 310 to determine the distance and angles of the trailer 104 relative to the vehicle 102. The sensor data may be transmitted to a user interface 312 (e.g., a display) within the vehicle 102 so the user can view the rear of the vehicle 102 more easily and clearly. The user may then drive the vehicle 102 toward the trailer and allow the guide 302 and the sensors 310 thereon to provide real-time feedback as the user is approaching the trailer 104 with the hitch 106. The first arm 304 and the second arm 306 provide a greater range to capture the tongue 124. For instance, if the user approaches the tongue 124 while the hitch 106 is still not aligned, the first arm 304 or the second arm 306 may engage with the tongue 124 and provide sensor data to instruct the user to angle the vehicle 102 more appropriately. In various embodiments, the user interface 312 may provide audible feedback (e.g., chimes, alarms, etc.) to indicate alignment or misalignment.

In some embodiments, the vehicle 102 uses sensor data from the various sensors 310 to automatically identify a current location of the tongue 124, automatically determine a target location of the hitch 106 along the rear end 118 of the vehicle 102 to move the hitch 106, and automatically move the hitch 106 to the target location. For instance, the guide 302 may be positioned along the track according to the distance between the vehicle 102 and the trailer 104. Similarly, the distance between the first arm 304 and the second arm 306 may be set based on the amount of misalignment between the vehicle 102 and the trailer 104. In other embodiments, a button or an icon is engaged by a user to move the guide 302. For example, an icon on the user interface 312, a button on the instrument panel, or a button on the rear portion of the vehicle 102 may be engaged by a user to manually move the guide 302 using one or more actuators. In this example, the user interface 312 or the buttons are electrically connected to the one or more actuators and instruct the one or more actuators to move the hitch 106.

Further, the vehicle 102 uses sensor data from the various sensors 310 to determine whether the trailer 104 is secured to the vehicle 102. For instance, once the hitch 106 and the tongue 124 are connected, they may be communicably coupled such that the hitch lead in system 300 is configured to receive and/or determine status data of the trailer 104 (e.g., trailer brake condition). Further, by integrating such communication features, the hitch lead in system 300 can indicate all components are connected and securely physically connected without the need for a second system.

Figure 5:
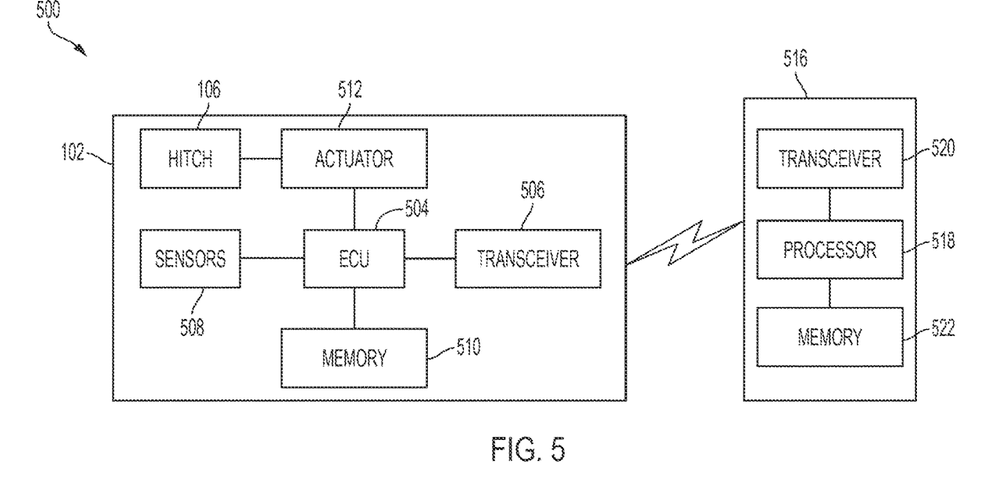
FIG. 5 illustrates a block diagram of trailer hitch lead-in system, according to various embodiments of the invention.

FIG. 5 illustrates a block diagram of the system 500. The system 500 includes a vehicle 102 and a remote data server 516.

The vehicle 102 may have an automatic or manual transmission. The vehicle 102 is a conveyance capable of transporting a person, an object, or a permanently or temporarily affixed apparatus. The vehicle 102 may be a self-propelled wheeled conveyance, such as a car, a sports utility vehicle, a truck, a van or other motor or battery driven vehicle. For example, the vehicle 102 may be an electric vehicle, a hybrid vehicle, a plug-in hybrid vehicle, a fuel cell vehicle, or any other type of vehicle that includes a motor/generator. Other examples of vehicles include bicycles, planes, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors and/or a navigation unit to drive autonomously.

The vehicle 102 includes an electronic control unit (ECU) 504, a transceiver 506, sensors 508, a memory 510, an actuator 512, and a hitch 106.

Each ECU 504 may be one or more ECUs, appropriately programmed, to control one or more operations of the vehicle. The one or more ECUs 504 may be implemented as a single ECU or in multiple ECUs. The ECU 504 may be electrically coupled to some or all of the components of the vehicle. In some embodiments, the ECU 504 is a central ECU configured to control one or more operations of the entire vehicle. In some embodiments, the ECU 504 is multiple ECUs located within the vehicle and each configured to control one or more local operations of the vehicle. In some embodiments, the ECU 504 is one or more computer processors or controllers configured to execute instructions stored in a non-transitory memory 510. The ECU 504 may utilize artificial intelligence logic and techniques to precisely determine a relative location and/or a relative orientation of a trailer 104 relative to the vehicle 102.

The vehicle 102 and one or more other vehicles similar to vehicle 102 may be coupled to a network. The network, such as a local area network (LAN), a wide area network (WAN), a cellular network, a digital short-range communication (DSRC), the Internet, or a combination thereof, connects the vehicle 102 to a remote data server 516.

The transceiver 506 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 506 may transmit data to and receive data from devices and systems not directly connected to the vehicle. For example, the ECU 504 may communicate with the remote data server 516. Furthermore, the transceiver 506 may access the network, to which the remote data server 516 is also connected. The vehicle 102 may communicate with other vehicles directly or via a network.

The sensors 508 include sensors configured to detect sensor data associated with the trailer 104. These sensors may include the sensors 310, as described herein.

The sensors 508 may also include a location sensor configured to detect location data associated with the vehicle 102. The location sensor may be a GPS unit or any other global location detection device. The ECU 504 may use the location data along with the map data stored in the memory 510 to determine a location of the vehicle. In other embodiments, the location sensor has access to the map data and may determine the location of the vehicle and provide the location of the vehicle to the ECU 504.

The vehicle 102 includes an actuator 512, which may be one or more actuators, configured to adjust the location of the hitch 106 and/or the guide 302. The actuator 512 may be controlled by the ECU 504 or may have one or more processors of its own to perform the functions described herein.

The memory 510 is connected to the ECU 504 and may be connected to any other component of the vehicle 102. The memory 510 is configured to store any data described herein, such as the map data, the location data, the vehicle data, the trailer data, and any data received from the remote data server 516 via the transceiver 506. The vehicle data associated with the vehicle 102 may indicate the features, capabilities, reference points, and measurements of the vehicle 102. The trailer data associated with the trailer 104 may indicate the features, capabilities, reference points, and measurements of the trailer 104.

The ECU 504 may use the detected data from the sensors 508 to provide feedback to the driver, and the ECU 504 may use the actuator 512 to move the hitch 106 to the ideal hitch position. The ideal hitch position may be determined by first determining a relative location and orientation of the trailer 104 and the vehicle 102. The ECU 504 may use sensor data from various sensors (e.g., rear corner sensors, rear-view camera, clearance sensors, angle detection sensor) to determine the relative location and orientation of the trailer 104 and the vehicle 102.

The remote data server 516 includes a processor 518, a memory 522, and a transceiver 520. The processor 518 of the remote data server 516 may be one or more computer processors configured to execute instructions stored in non-transitory memory 522. The remote data server 516 may store data, such as traffic data, road condition data, and map data in the memory 522 and communicate the stored data to the vehicle 102 via the transceiver 520. While only one remote data server 516 is shown, any number of remote data servers in communication with each other may be used.

As used herein, "substantially" may refer to being within plus or minus 10% of the value.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for aligning a trailer to attach to a vehicle, the system comprising:
    a guide coupled to a tow hitch of the vehicle, the guide having:
        a first arm rotatably coupled to a hinge and extending out in a straight line from the hinge; and
        a second arm rotatably coupled to the hinge and extending out in a straight line from the hinge at an angle relative to the first arm, the first arm and the second arm having proximal ends located on or near the hinge and distal ends configured to extend outward from a back end of the vehicle, the first arm and the second arm configured to provide a space between the first arm and the second arm, the distal ends of the first arm and the second arm being unconnected and further apart than the proximal ends of the first arm and the second arm, the space configured to receive a tongue of the trailer;
    a plurality of sensors disposed along the first arm and the second arm of the guide, the plurality of sensors configured to detect sensor data indicative of an alignment between the vehicle and the trailer; and
    an electronic control unit (ECU) configured to:
        receive the sensor data;
        determine a position of the tongue relative to the first arm and the second arm; and
        transmit the position to the vehicle.

2. The system of claim 1, further comprising a user interface configured to receive the determination of the position of the tongue relative to the first arm and the second arm.

3. The system of claim 1, wherein the plurality of sensors comprise a camera configured to detect image data of the environment behind the vehicle.

4. The system of claim 3, wherein the ECU is further configured to:
analyze the image data from the camera; and
determine a proximity of the trailer to the vehicle or an orientation of the trailer relative to the vehicle.

5. The system of claim 1, wherein the plurality of sensors comprise a RADAR or LIDAR sensor.

6. The system of claim 5, wherein the plurality of sensors are configured to detect an angle of the trailer relative to the vehicle.

7. The system of claim 1, wherein the first arm and the second arm are configured to rotate about the hinge such that the distance between the first arm and the second arm is variable.

8. The system of claim 1, wherein the first arm and the second arm are configured to form a V-shape.

9. The system of claim 1, wherein the ECU is further configured to actuate an actuator configured to position the guide.

10. The system of claim 1, wherein the ECU is further configured to determine an ideal hitch location based on the sensor data, and instruct an actuator to move the guide to the ideal hitch location.

11. The system of claim 1, wherein the guide is rotatably coupled to the hinge such that the guide may be folded in a stowed position and rotated about the hinge to a deployed position.

12. A tow hitch lead-in system comprising:
a vehicle having a hitch disposed on a rear end of the vehicle;
a trailer having a tongue disposed on a front end of the trailer and configured to couple to the hitch;
a guide coupled to a tow hitch of the vehicle, the guide having a first arm extending from a hinge and a second arm extending from the hinge at an angle relative to the first arm and configured to provide an error tolerance for aligning the vehicle and the trailer; and
a plurality of sensors disposed along the first arm and the second arm of the guide, the plurality of sensors configured to detect sensor data indicative of an alignment between the vehicle and the trailer.

13. The system of claim 12, wherein the first arm and the second arm are configured to provide a space therebetween to receive the tongue of the trailer, the space defined by the hinge and distal ends of the first arm and second arm.

14. The system of claim 13, wherein the first arm and the second arm are configured to rotate about the hinge such that the distance between the first arm and the second arm is variable.

15. The system of claim 12, further comprising an electronic control unit (ECU) configured to:
receive the sensor data;
determine a position of the tongue relative to the first arm and the second arm; and
transmit the determination to the vehicle.

16. The system of claim 15, further comprising a user interface configured to receive the determination of the position of the tongue relative to the first arm and the second arm.

17. The system of claim 15, wherein the ECU is further configured to:
analyze the sensor data; and
determine a proximity of the trailer to the vehicle or an orientation of the trailer relative to the vehicle.

18. A method for aligning a vehicle to a trailer, the method comprising:
deploying a guide coupled to a tow hitch of the vehicle, the guide extending outwards from the vehicle and including a first arm and a second arm in a V-formation;
detecting, by one or more sensors located along the first arm and the second arm of the guide, sensor data indicating a location and an orientation of the trailer relative to the vehicle;
determining, by an electronic control unit (ECU), a position of a tongue of the trailer relative to the tow hitch of the vehicle based on the sensor data; and
transmitting the determination of the position of the tongue to the vehicle.

19. The method of claim 18, further comprising:
identifying, by the ECU, potential contact between the guide and the tongue based on the sensor data;
determining, by the ECU, a vehicle movement to align the vehicle and the trailer; and
transmitting the determination of the vehicle movement to the vehicle, wherein the determination is received at a user interface.

* * * * *